United States Patent
Limburg et al.

(10) Patent No.: US 6,543,262 B2
(45) Date of Patent: Apr. 8, 2003

(54) LOCK FOR LOCKING THE STEERING SHAFT OR THE GEAR RACK OF THE STEERING GEAR OR THE OUTPUT SHAFT OF THE TRANSMISSION OF A MOTOR VEHICLE

(75) Inventors: Hans-Joachim Limburg, Schwabhausen (DE); Ludwig Zauser, Gernlinden (DE); Horst Zillmann, Munich (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 0 days.

(21) Appl. No.: 09/885,122

(22) Filed: Jun. 21, 2001

(65) Prior Publication Data

US 2002/0029595 A1 Mar. 14, 2002

(30) Foreign Application Priority Data

Jun. 23, 2000 (DE) .......................... 100 30 688

(51) Int. Cl.$^7$ ............................................. B60R 25/02
(52) U.S. Cl. ........................................... 70/186; 70/252
(58) Field of Search ...................... 70/182, 183, 184, 70/185, 186, 252; 292/144

(56) References Cited

U.S. PATENT DOCUMENTS

| | | | | |
|---|---|---|---|---|
| 1,736,900 A | * | 11/1929 | Carpenter ..................... | 70/185 |
| 4,581,909 A | * | 4/1986 | Weber .......................... | 70/186 |
| 5,495,732 A | * | 3/1996 | Nagae et al. .................. | 70/186 |
| 5,632,167 A | * | 5/1997 | Kawachi et al. ............... | 70/1.5 |
| 5,718,132 A | * | 2/1998 | Riefe et al. ................... | 180/277 |
| 5,848,540 A | * | 12/1998 | Pieper .......................... | 70/252 |
| 5,906,120 A | * | 5/1999 | Thacker et al. ............... | 70/183 |
| 5,974,841 A | * | 11/1999 | Naganuma .................... | 70/186 |

FOREIGN PATENT DOCUMENTS

| | | |
|---|---|---|
| DE | 4436326 | 10/1995 |
| DE | 19727422 | 6/1998 |
| DE | 29919649 | 5/2000 |

* cited by examiner

Primary Examiner—Lloyd A. Gall
Assistant Examiner—Michael J. Kyle
(74) Attorney, Agent, or Firm—Bacon & Thomas, PLLC (57) ABSTRACT

A lock is fitted with a locking element and a control element which is rotated by a drive to-and-fro in order to axially reciprocate the locking element through a coaxial drive element between a locked and an unlocked position. The drive element and the control element are also configured coaxially and cooperative by means of a cross-pin which is axially displaceable in a transverse borehole of the inner drive element and by means of two helical inner channels as well as an adjoining plane terminal surface of the outer control element which runs perpendicular to the axis of rotation of the control element and is bounded by a side ramp running from the bottom of one channel past the other channel on the outside thereof toward the drive element. The drive element and control element cooperate in such manner that when the control element rotates in that direction in which the cross-pin runs in the channels toward the terminal surface, the drive element shall be commensurately axially displaced and remain in the axial position it has reached until the control element is rotated in the opposite direction and the cross-pin moves in the channels away from the terminal surface causing the drive element to move axially in the opposite direction.

6 Claims, 9 Drawing Sheets

LOCK FOR LOCKING THE STEERING SHAFT OR THE GEAR RACK OF THE STEERING GEAR OR THE OUTPUT SHAFT OF THE TRANSMISSION OF A MOTOR VEHICLE

BACKGROUND OF THE INVENTION

1. Field of the Invention

The invention relates to a lock for locking the steering shaft or the gear rack of the steering gear or the output shaft of the transmission of a motor vehicle, said lock being fitted with a locking element displaceable to-and-fro between a locked and an unlocked position, and further with a control element rotated to-and-fro by means of a drive to axially displace a drive element cooperating with the locking element or to displace the locking element itself in either direction.

2. Description of the Related Art

A lock of this kind is known, wherein special steps are taken to assure that the locking element always shall move exactly the same distance to the locked or unlocked position but not farther, not even when the control element continues rotating, that is even when the drive is not stopped at the moment when the locking element has reached the locked or unlocked position. For that purpose the drive element or the locking element and the control element are configured coaxially, and said drive element or the locking element and the control element cooperate by means of (a) two radial projections which are diametrically opposite the axis of rotation of the control element and are each displaceable as well as spring-loaded perpendicularly to the control element's axis of rotation, (b) two bevels as well as two terminal surfaces which are situated in the same plane perpendicular to the control element's axis of rotation and can extend as far as next to either bevel, in such manner that the inner drive element or the inner locking element shall be commensurately axially displaced during the rotation of the outer control element in that direction in which the protrusions run on the bevels to the terminal surfaces, in order that, when the projections move from the bevels onto the terminal surfaces, they shall stand still and remain in the attained axial position until the control element is rotated in the opposite direction and the protrusions move on the bevels away from the terminal surfaces, whereby the drive element or the locking element shall be shifted axially in the opposite direction. These protrusions may be situated at the drive element or the locking element, and the bevels and the terminal surfaces may be located on the control element. The protrusions, if desired, may comprise two pins mounted in a common transverse borehole of the drive element or the locking element and may be biased by a common helical compression spring (see German Patent No. DE 44 36 326 C1).

The objective of the invention is to improve said known lock and in particular to reduce the number of parts, to simplify assembly and to lower manufacturing costs.

BRIEF DESCRIPTION OF THE DRAWINGS

Preferred embodiments of the lock of the invention are described below in relation to the attached drawings, wherein.

DETAILED DESCRIPTION OF THE PREFERRED EMBODIMENTS OF THE INVENTION

Figure 1:
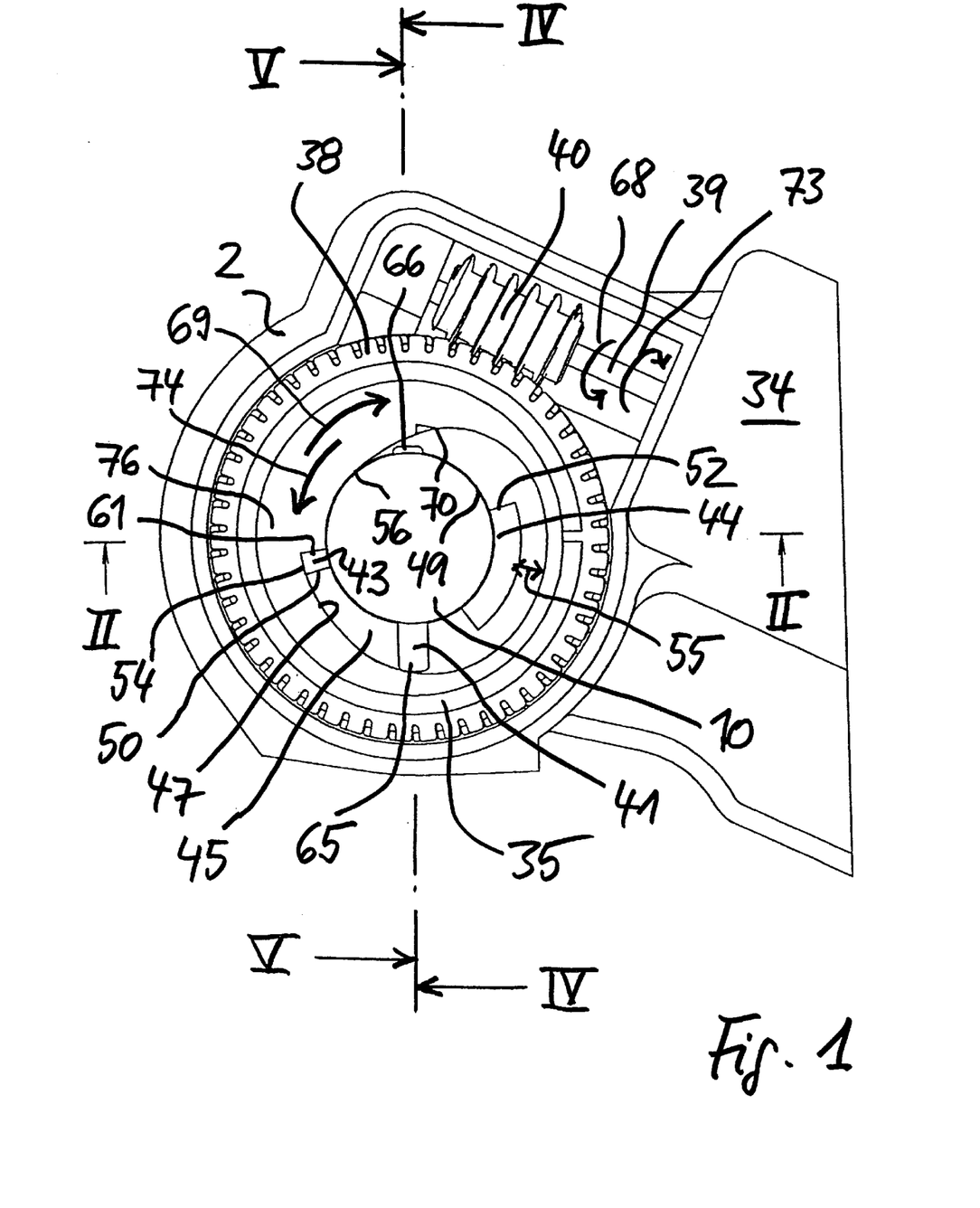
FIG. 1 is a top view in the direction of the arrow I of FIG. 2, the cover being off.
Figure 2:
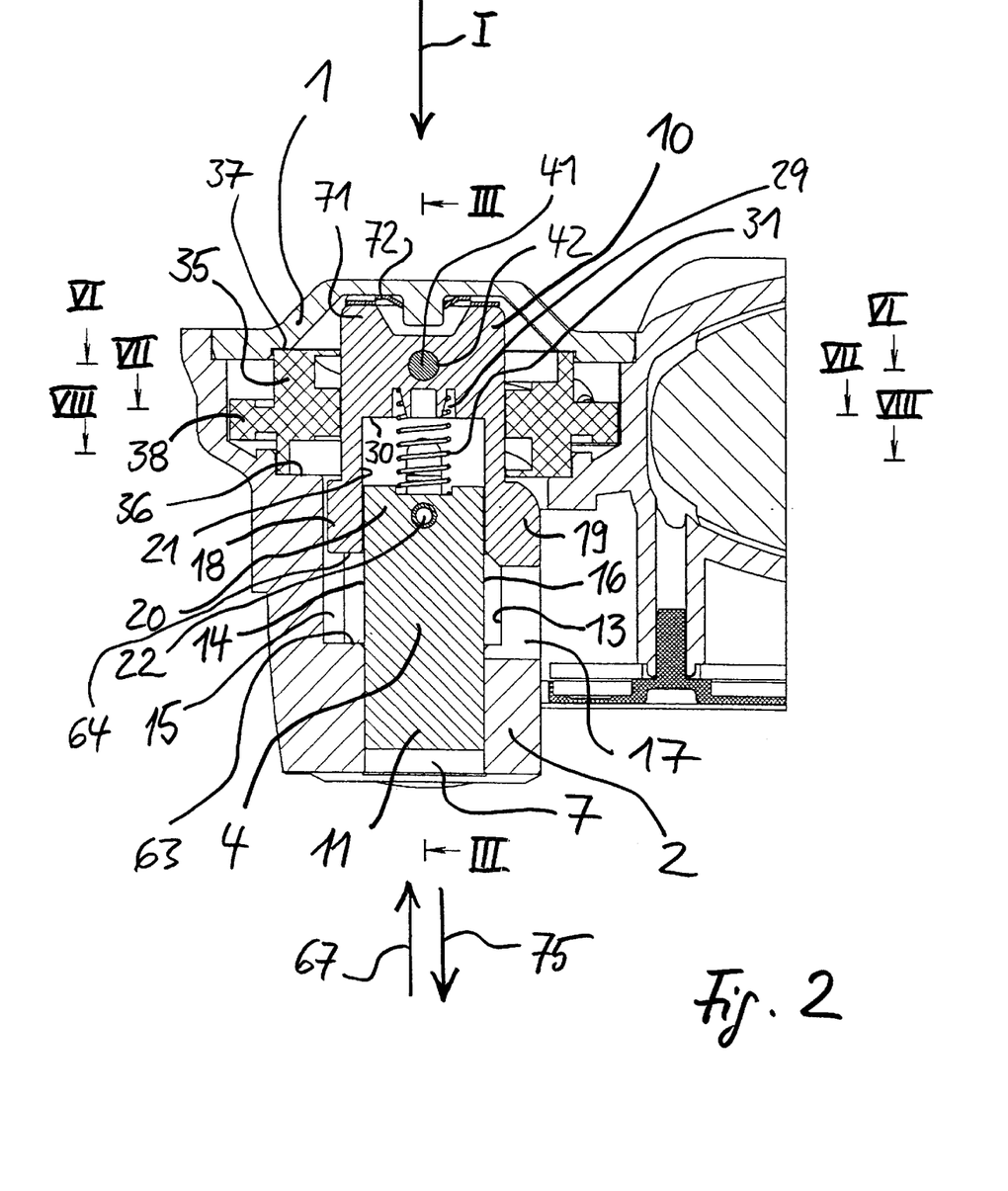
FIG. 2 is a longitudinal section view along line II—II in FIG. 1.
Figure 3:
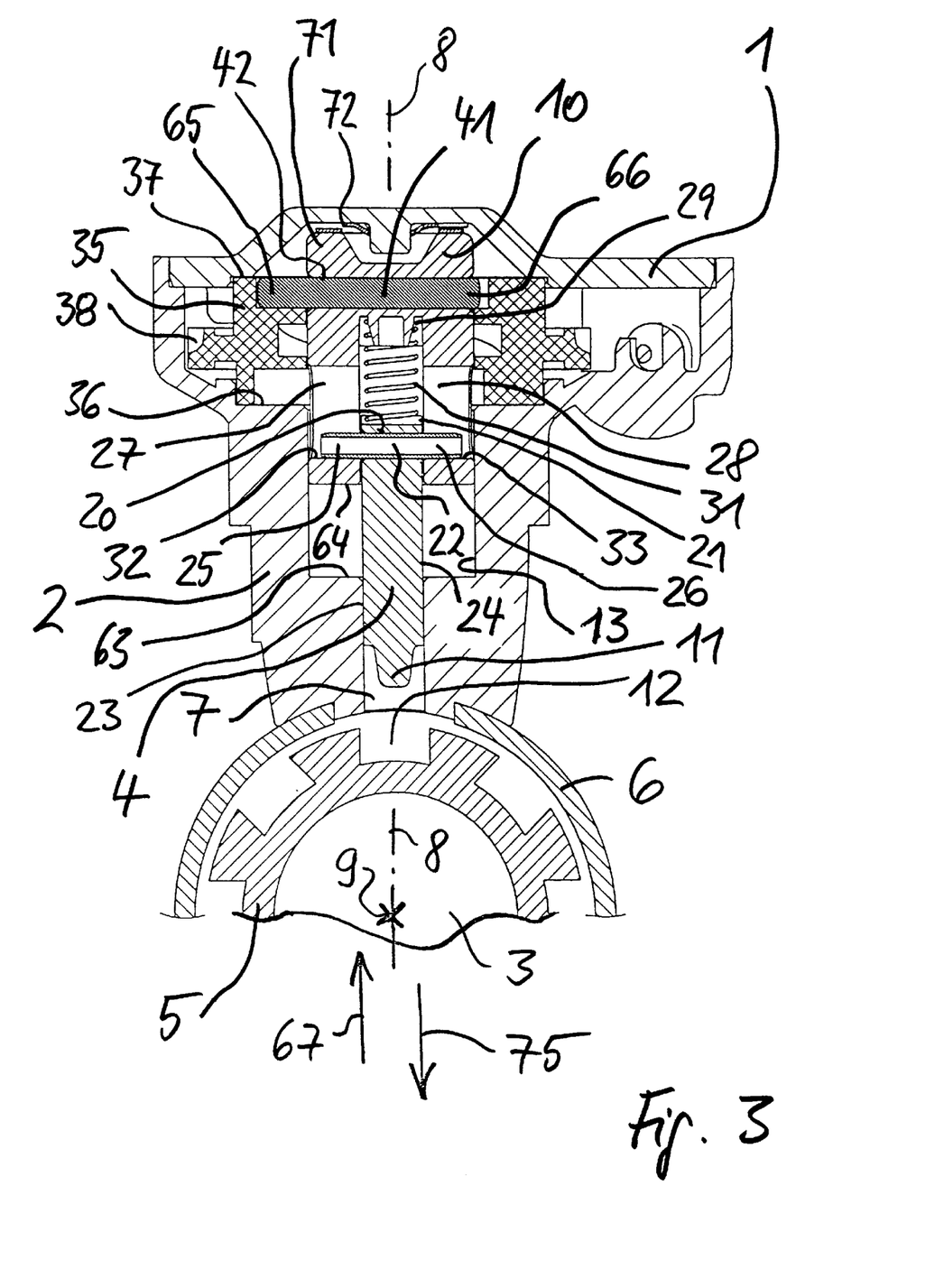
FIG. 3 is a longitudinal section view along line III—III of FIG. 2.

The lock shown in FIGS. 1 through 3 comprises a housing 2 sealed by a cover 1 and is used to lock the motor vehicle steering shaft 3 shown in FIG. 3 by means of a locking element 4 cooperating with a locking bush 5 affixed to the steering shaft 3. The steering shaft 3 and the locking bush 5 are enclosed by a tubular case 6 to which the housing 2 is affixed. The locking element 4 is in the form a cross-sectionally rectangular stud and rests in an axially displaceable manner in a duct 7 of matching cross-section of the housing 2, the longitudinal axis 8 of said duct 7 orthogonally intersecting the longitudinal axis 9 of the steering shaft 3.

The locking element 4 is displaceable to-and-fro (i.e., extended and retracted) by a drive element 10 between, on one hand a locked position where, by the end 11 located away from the drive element 10 engaging one of several locking apertures 12 of the locking bush 5, the steering shaft 3 is made non-rotatable. On the other hand, when locking element 4 is moved to the unlocked position shown in FIG. 3, the locking element 4 no longer engages by its end 11 any of the locking apertures 12 of the locking bush 5 and the steering shaft 3 is thereby released.

The drive element 10 is designed as a cylindrical bolt and is axially displaceable in a cylindrical borehole 13 of the housing 2, said borehole 13 running coaxially with the duct 7 receiving the locking element 4. A longitudinal slot 15 in the housing 2 opens opposite the narrow side 14 of the locking element 4 Son the left in FIG. 2) into the borehole 13. Opposite the narrow side 16 of the locking element 4, which is on the right in FIG. 2, the borehole 13 also communicates with a longitudinal slot 17 in the housing 2. An external radial protrusion 18 of the drive element 10 enters the longitudinal slot 15 and the longitudinal slot 17 receives a radially extending protrusion 19 of the drive element 10.

The end 20 of the locking element 4 located away from the steering shaft 3 is received in a blind hole 21 of the drive element 10, said blind hole 21 has a cross-section corresponding to the rectangular cross-section of the locking element 4. Said end 20 is fitted with a cross-pin 22 running perpendicularly to the two wide sides 23, 24 of the locking element 4. The two ends 25, 26 of said cross-pin 22 project from the locking element 4 and enter two lateral elongated slots 27, 28 of the drive element 10. A helical compression spring 31 is mounted between the end 20 of the locking element 4 and an annular recess 29 in the bottom 30 of the blind hole 21 of the drive element 10 and biases the two projecting ends 25, 26 of the cross-pin 22 of the locking element 4 against the ends 32, 33 near the steering shaft 3 of the two elongated slots 27, 28 of the drive element 10. The locking element 4 is able to enter the blind hole 21 of the drive element 10 against the force of the helical compression spring 31 when—during the displacement of the locking element 4 by the drive element 10 into the locked position—none of the locking apertures 12 of the locking bush 5 secured to the steering shaft 3 is aligned with the locking element 4 so as to receive its free end 11.

A control element 35 driven in reversible directions by an electric motor 34 that when rotated in one direction axially displaces the drive element 10 into the position of FIGS. 2 and 3 to drive the locking element 4 into the unlocked position and when rotated in the opposite direction, axially displaces the drive element to 10 in the opposite direction to drive the locking element 4 into the locked position. The control element 35 is configured coaxially with the drive element 10 which it encloses, and furthermore rests in rotatable manner in the housing 2 about the common longitudinal axis 8 of the locking-element duct 7 and the drive-element borehole 13 between an annular surface 36 of the housing 2 coaxial with said longitudinal axis 8 and an annular surface 37 of the cover 1 coaxial with this longitudinal axis 8. Said control element 35 is formed as a worm gear fitted with external teeth 38 engaged by a drive worm 40 affixed to the output shaft 39 of the electric motor 34. This electric motor 34 may be a 12 VDC motor the direction of rotation of which is reversed by a reversal of applied electrical power and which does not move if it is unpowered.

The external control element 35 cooperates with a cylindrical cross-pin 41 of the inner drive element 10 supported in an axially displaceable manner in a cylindrical transverse borehole 42 of the drive element 10. For that purpose the control element 35 is fitted with two helical inner channels 43, 44 and two plane terminal surfaces 45, 46 each lying perpendicular to the axis of rotation 8 of the control element 35. The channels 43, 44 extend between the terminal surfaces 45, 46 each of which is bounded by a side ramp 47 and 48 respectively of specified design.

As shown in particular detail in FIGS. 4a through 5b, the two inner channels 43, 44 of the control element 35 extend along that cylindrical borehole 49 of the control element 35 which receives the drive element 10. The first channel 43 is shown in FIG. 1 to extend to the left of the drive element 10 to the first terminal surface 45 of the control element 35, away from the steering shaft 3, and at a first end 50 (FIG. 4a) merges into the first terminal surface 45. At a second end 51 (FIG. 5b) thereof, the first channel 43 merges into the second terminal surface 46 of the control element 35 which is closer to the steering shaft 3. The second channel 44 which in FIG. 1 runs on the right of the drive element 10 to the first terminal surface 45 merges at a first end 52 (FIG. 5a) into the first terminal surface 45 and at a second end 53 (FIG. 4b) into the second terminal surface 46.

Figure 4A:
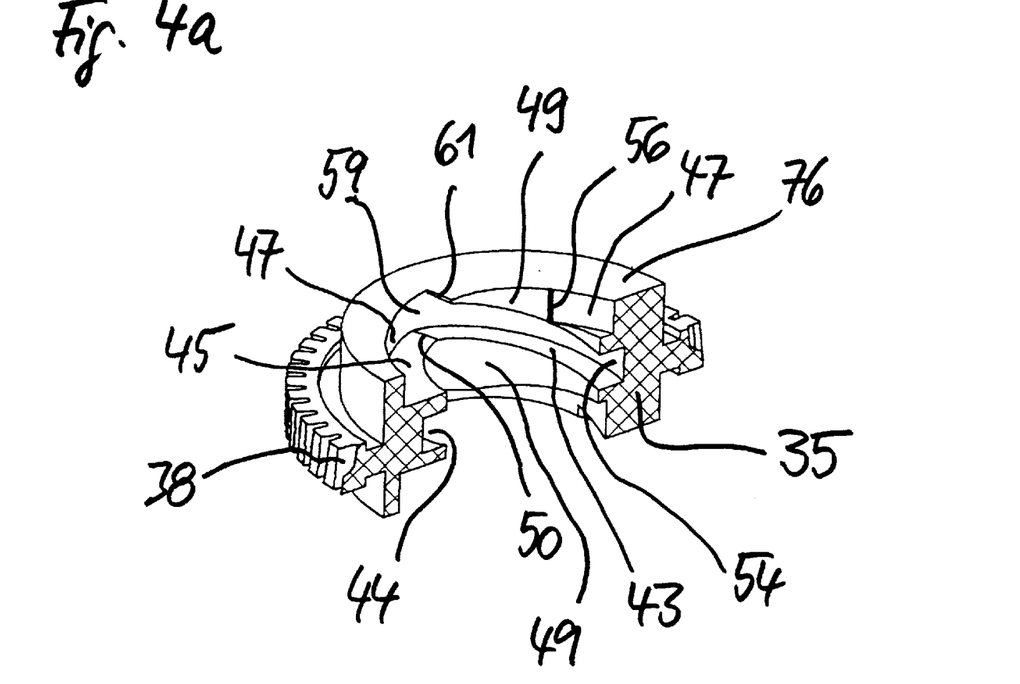
FIG. 4a is a longitudinal section view of the control element along line IV—IV in FIG. 1 seen in perspective and from above.
Figure 4B:
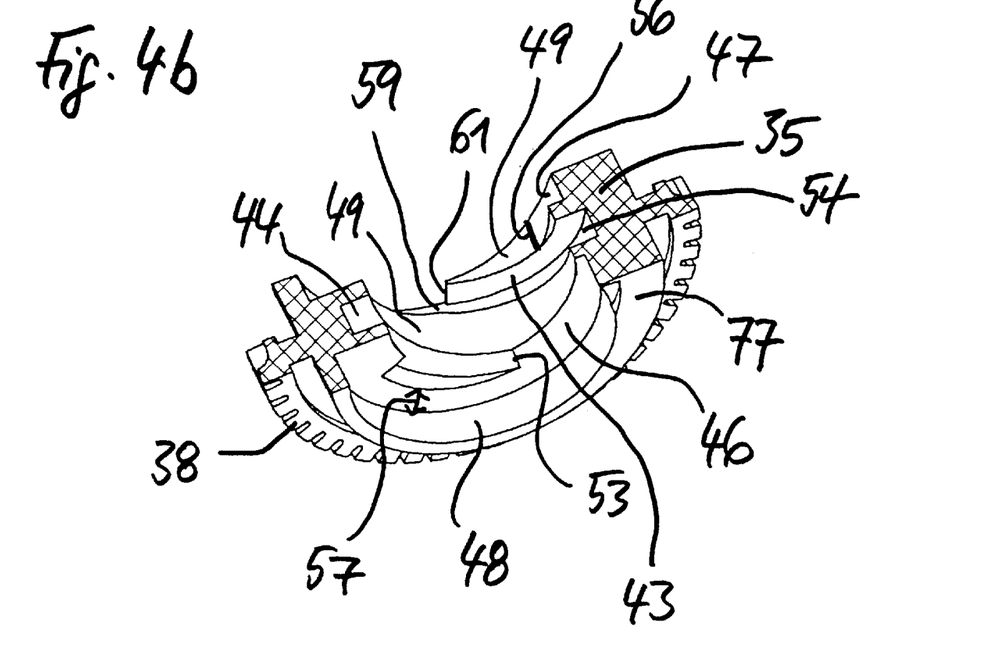
FIG. 4b is a longitudinal section view of the control element along line IV—IV of FIG. 1 seen in perspective and from below.
Figure 5A:
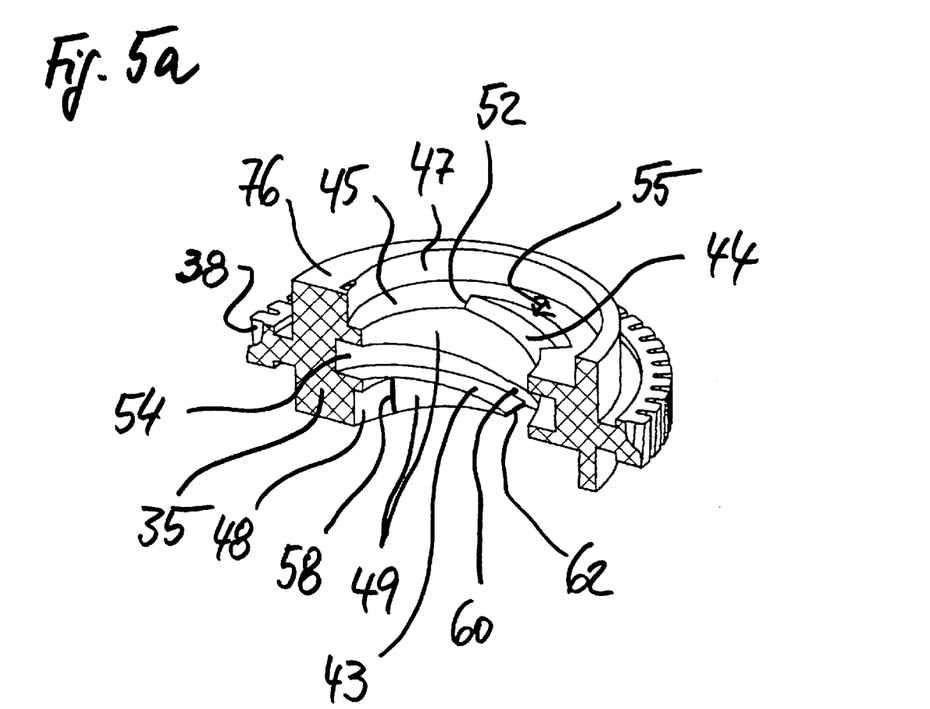
FIG. 5a is a longitudinal section view of the control element along line V—V of FIG. 1 seen in perspective and from above.
Figure 5B:
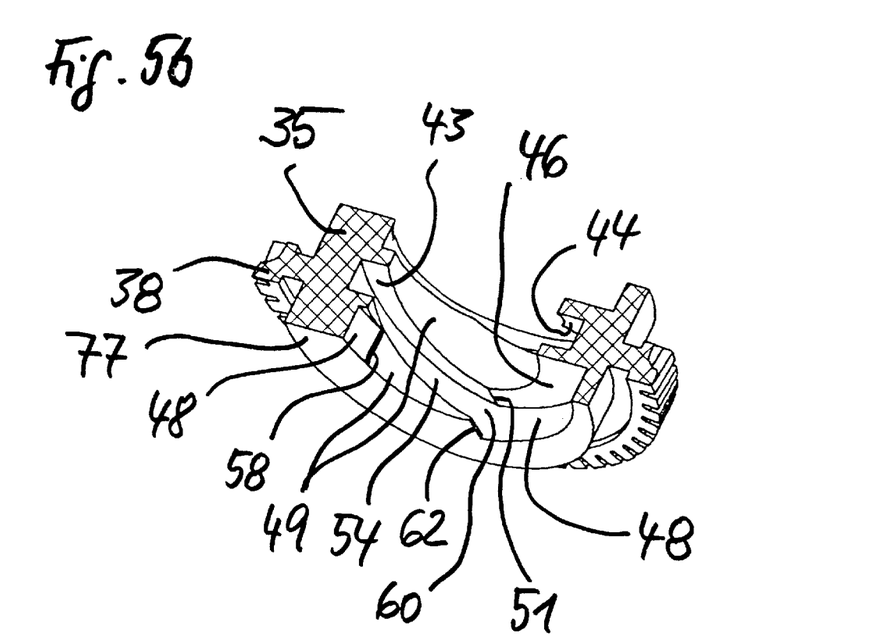
FIG. 5b is a longitudinal section view of the control element along line V—V of FIG. 1 seen in perspective and from below.

The vertical side ramp 47 of the first terminal surface 45 of the control element 35 extends from the bottom 54 of the first channel 43 of the control element 35 outwardly past and up to a given distance 55 from the second channel 44 of the control element 35 toward the borehole 49 of the control element 35 that receives the drive element 10 and in particular the end 56 that merges into the borehole 49 (FIGS. 4a, 5a). Again, the vertical side ramp 48 of the second terminal surface 46 of the control element 35 extends from the bottom 54 of the first channel 43, past and outside and at a given distance 57 from the second channel 44 toward the borehole 49 where it merges at the related end 58 in the borehole 49 (FIGS. 4b, 5b).

For manufacturing, the two openings 59, 60 of the first channel 43 of the control element 35 on the first terminal surface 45 of the control element 35 (FIGS. 4a, 4b) and respectively on the second terminal surface 46 of the control element 35 (FIGS. 5a, 5b), each comprise an end face 61, on the side away from the first terminal surface 45 and opposite the first end 50 of the first channel 43 and respectively an end face 62 on the side away from the second terminal surface 46 and opposite the second end 51 of the first channel 43, each end face 61 or respectively 62 being situated in a plane passing through the axis of rotation 8 of the control element 35.

Figure 6:
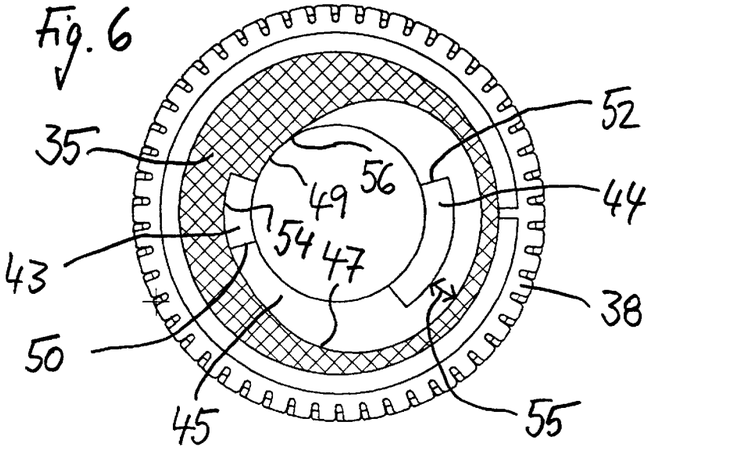
FIG. 6 is a cross-section of the control element along line VI—VI of FIG. 2.
Figure 7:
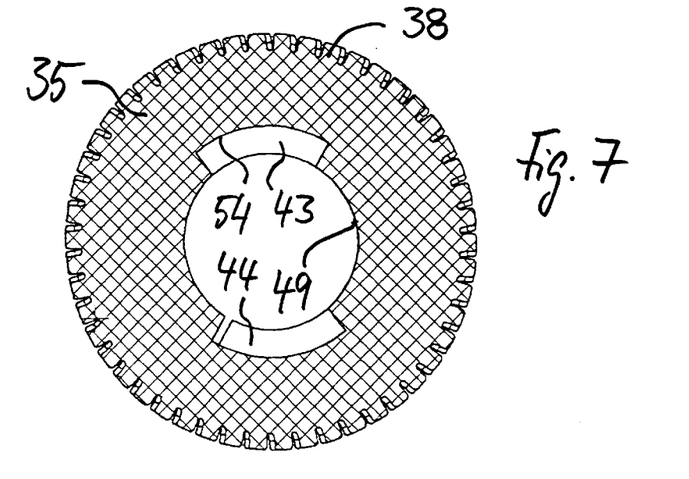
FIG. 7 is a cross-section of the control element along line VII—VII of FIG. 2.
Figure 8:
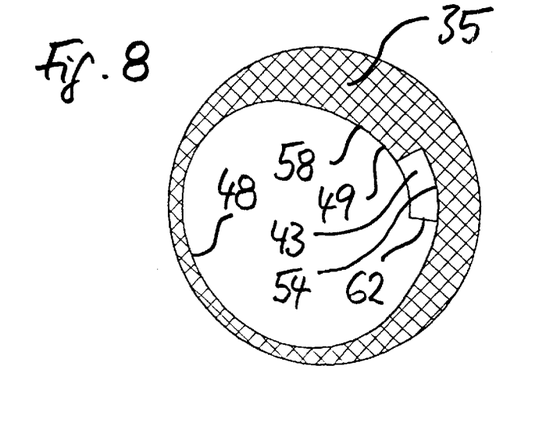
FIG. 8 is a cross-section of the control element along line VIII—VIII of FIG. 2.

FIGS. 6 through 8 show the described design of the control element 35.

The described motor-vehicle steering lock operates as follows:

When the locking element 4 is in the locked position, the drive element 10 which is located within borehole 13 of housing 2 rests against a stop 63 firmly affixed to the housing, that is the drive element 10 rests with its terminal face 64 enclosing the locking element 4 at the bottom of the borehole 13 of the housing 2, said bottom constituting the stop 63. The cross-pin 41 of the drive element 10 extends, namely the two ends 65, 66 of the cross-pin 41 that project from the transverse borehole 42 of the drive element 10, extend directly along the second terminal surface 46 of the control element 35 outside the path along which the end face 62 of the opening 60 of the first channel 43 of the control element 35 associated with the second terminal surface 46 moves when the control element 35 is being rotated.

The electric motor 34 is turned on and thereupon rotates the drive worm 40 in the direction of the arrow 68 and the control element 35 is rotated in the direction of the arrow 69 in FIG. 1 to displace the locking element 4 axially out of the locked position and the drive element 10 axially out of the above discussed axial position in the direction of the arrow 67 of FIGS. 2, 3 and then into the unlocked position and into the corresponding axial position of FIGS. 2, 3 respectively. As a result, the two ends 65, 66 of the cross-pin 41 of the drive element 10 that project from the transverse borehole 42 of the drive element 10 depart from the second terminal surface 46 of the control element 35 and enter the helical channels 43, 44 in order to move from the second ends 51, 53 of the channels 43, 44 to their first ends 50, 52. In the corresponding angular position of the control element 35, the drive element 10 has reached that axial position wherein the locking element 4 assumes the unlocked position and at which the drive element 10 also shall be maintained even if the control element 35 continues rotating in the direction of the arrow 68. Consequently, the locking element 4 in such a case will remain in the unlocked position.

This is so because the two ends 65, 66 of the cross-pin 41 of the drive element 10 which both project from the transverse borehole 42 of the drive element 10 pass onto the first terminal surface 45 of the control element 35 in order to move along the first terminal surface 45 away from the first ends 50, 52 of the channels 43, 44 of the control element 35. During this movement the upper cross-pin end 66 shown in FIG. 1 comes to rest against the side ramp 47 of the first terminal surface 45 at the point 70, so that, as the control element 35 continues rotating in the direction of the arrow 69, the cross-pin end 66 is moved into the transverse borehole 42 of the drive element 10 by the segment of the side ramp 47, which extends between the point 70 and the end 56 of the side ramp 47. Thus the lower cross-pin end 65 shown in FIG. 1 shall be displaced sufficiently out of the transverse borehole 42 of the drive element 10 to move on the first terminal surface 45 over the second channel 44 and then in turn will be moved by the side ramp 47 into the transverse borehole 42 of the drive element 10, namely by the side ramp segment between the first end 52 of the second channel 44 and the end 56 of the side ramp 47, the other cross-pin end 66 moving out of the transverse borehole 42 of the drive element 10 onto the first terminal surface 45. As long as the control element 35 rotates in the direction of the arrow 69, the cross-pin 41 of the drive element 10 is forced to stay on the first terminal surface 45 of the control element 35, and as a result the drive element 10 remains in the axial position shown in FIGS. 2, 3. In this axial position a cup spring 72 mounted between the cover 1 of the housing 2 and the end 71 of the drive element 10 at the side of said cover 1 presses the cross-pin 41, i.e. its ends 65, 66 projecting out of the transverse borehole 42 of the drive element 10, against the first terminal surface 45 and out of the path along which the end face 61 of the opening 59 of the first channel 43 of the control element 35 associated with the first terminal surface 45 is moving when the control element 35 is being rotated. The locking element 4 correspondingly remains in the unlocked position shown in FIGS. 2, 3.

Only when the electric motor 34 runs in the opposite direction and the drive worm 40 as well as the control element 35 are rotated by it in the opposite direction, namely when the drive worm 40 is rotated in the direction of the arrow 73 and the control element 35 is rotated in the direction of the arrow 74 of FIG. 1, will the locking element 4 be displaced out of the unlocked position and the drive element 10 out of the corresponding axial position of FIGS. 2, 3 in the direction of the arrow 75 of FIGS. 2, 3, axially into the locking position and respectively into the corresponding axial position. This displacement begins as soon as the two ends 65, 66 of the cross-pin 41 of the drive element 10 projecting from the transverse borehole 42 of the drive element 10 have left the first terminal surface 45 of the control element 35 and enter the two helical channels 43, 44 of the control element 35 at the first ends 50, 52 of said channels 43, 44. This displacement ends as soon as the cross-pin ends 65, 66 leave the channels 43, 44 at their second ends 51, 53 and move onto the second terminal surface 46 of the control element 35. Then, the control element 35 may still be further rotated in the direction of the arrow 74 without imparting any motion to the drive element 10 and the locking element 4 because the side ramp 48 of the second terminal surface 46 runs similarly to the side ramp 47 of the first terminal surface 45 of the control element 35 and causes a similar axial displacement of the cross-pin 41 of the drive element 10 in the transverse borehole 42 thereof.

Accordingly, the electric motor 34 is not required to stop abruptly when the locking element 4 reaches the unlocked or locked position and when the drive element 10 has reached the particular corresponding axial position. Rather, the motor 34 may continue to run in the direction of the arrow 68 or of the arrow 73 and drive the control element 35 through any additional angle in the direction of the arrows 69 or 74 without causing displacement of the locking element 4 and of the drive element 10, and without the locking element 4 leaving the unlocked or locked position and without the drive element 10 leaving the specific corresponding axial position.

It is not required that the electric motor 34 rotates the control element 35 only relatively slowly. Instead the above described cooperation of the control element 35 and the locking element 4 by means of the drive element 10 shall reliably take place when the control element 35 is rotated relatively fast.

Figure 9:
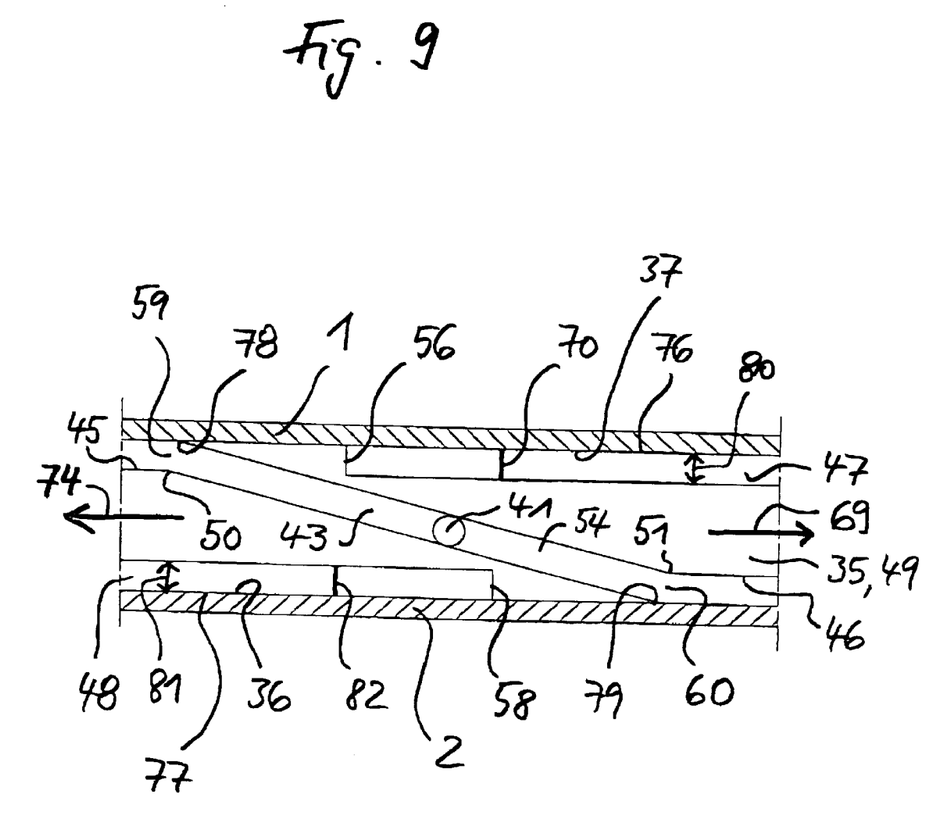
FIG. 9 is a geometric development of the inner slot of the control element of FIG. 1 extending along the left of the drive element to the first terminal surface of the control element in accordance with another embodiment of the invention.
Figure 10:
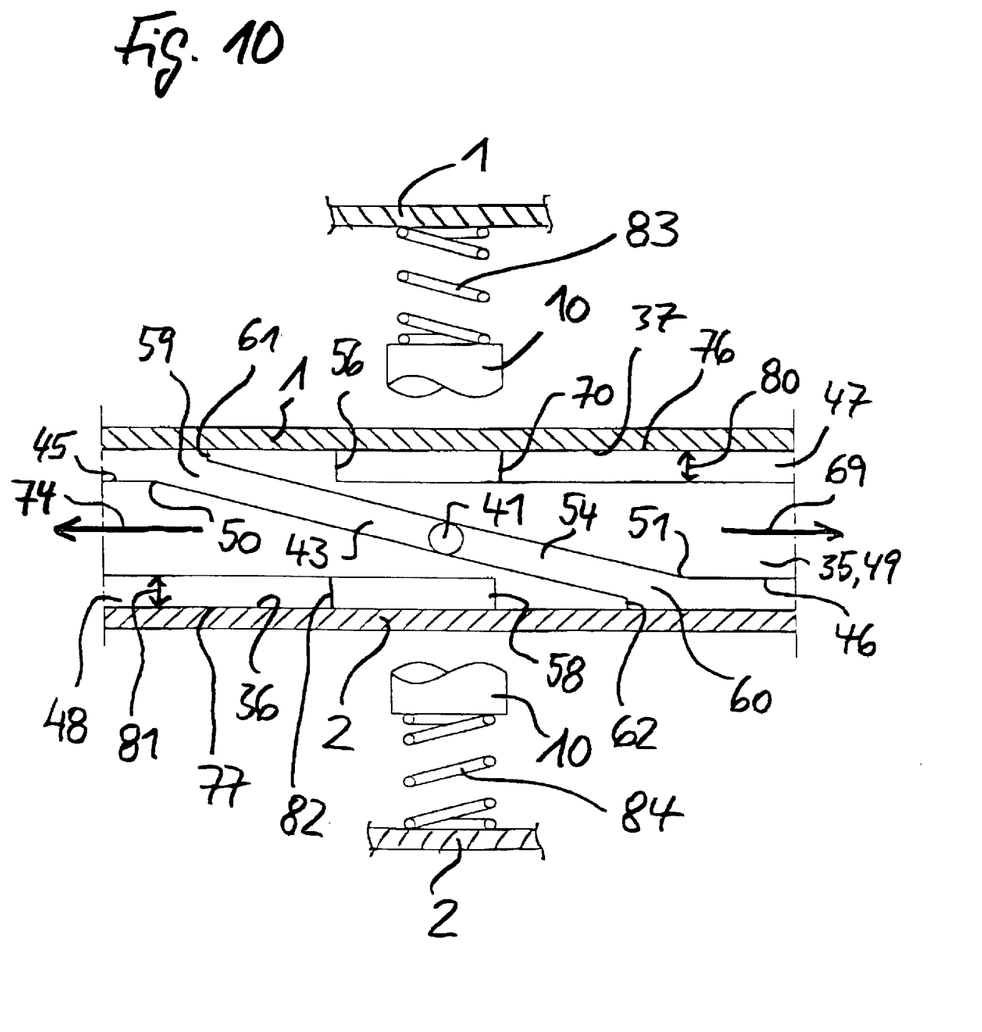
FIG. 10 is a geometric development similar to FIG. 9 in accordance with still another embodiment of the invention.
Figure 11:
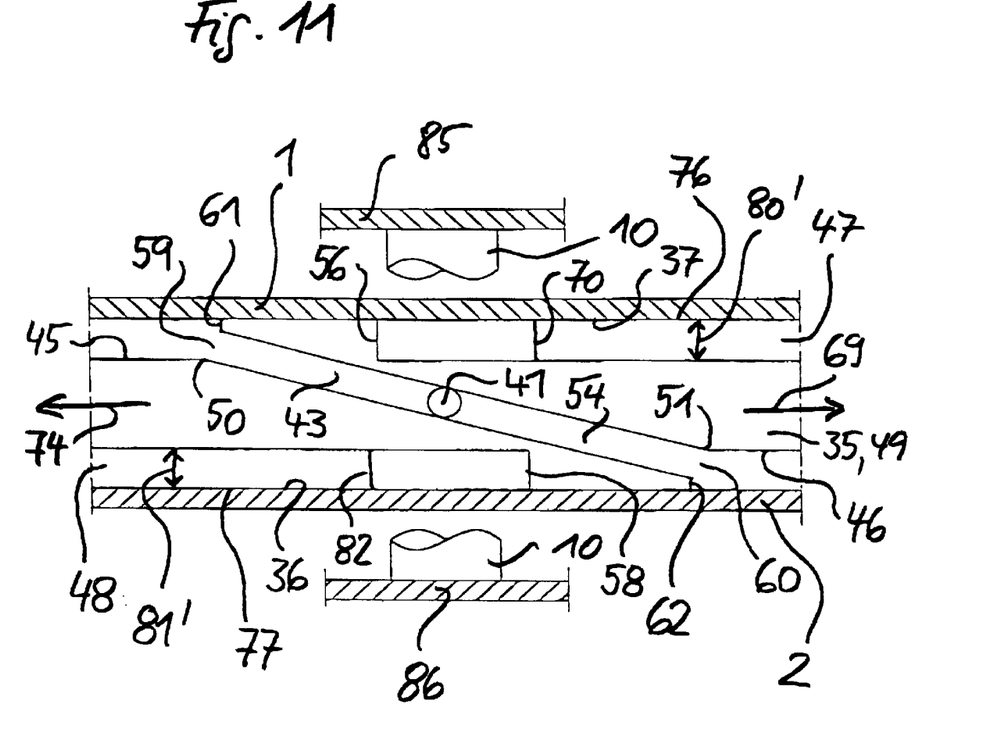
FIG. 11 is a geometric development similar to FIG. 9 in accordance with still another embodiment of the invention.

FIGS. 9 through 11 diagrammatically show various designs of the two openings 59, 60 of the first channel 43 and the two terminal surfaces 45, 46 of the control element 35 as well as of the support for the drive element 10 in the housing 2.

As shown in FIG. 9, the first channel 43 of the control element 35 runs on one hand as far as the first end face 76 of the control element 35 resting against the annular surface 37 of the cover 1 of the housing 2 and on the other hand as far as the second end face 77 of the control element 35 resting against the annular surface 36 of the housing 2. Thus, the opening 59 of the first channel 43 associated with the first terminal surface 45 of the control element 35 is bounded by a sharp linear edge 78 on that side which is away from the first terminal surface 45 and opposite the first end 50 of the first channel 43, and the opening 60 of the first channel 43 associated with the second terminal surface 46 of the control element 35 is bounded, on the side away from the second terminal surface 46 and opposite the second end 51 of the first channel 43, also by a sharp, linear edge 79. The first terminal surface 45 is situated a distance 80 from the first end face 76 of the control element 35, said distance 80 matching the diameter of the cross-pin 41 of the drive element 10. Again, the distance 81 between the second terminal surface 46 and the second end face 77 of the control element 35 substantially corresponds to the diameter of the cross-pin 41 of the drive element 10. The drive element 10 is supported in the housing 2 solely by means of the cross-pin 41.

When the control element 35 rotates in the direction of the arrow 69 of FIG. 9, and the cross-pin 41 of the drive element 10 projects between the second terminal surface 46 of the control element 35 and the annular surface 36 of the housing 2, the cross-pin 41 located at the opening 60 of the first channel 43 of the control element 35 and associated with the second terminal surface 46 enters the first channel 43 in order to move therein as far as the opening 59 associated with the first terminal surface 45 of the control element 35. Thus the cross-pin 41 moves at the first end 50 of the first channel 43 onto the first terminal surface 45 which moves past the cross-pin 41 in the direction of the arrow 69. As soon as the point 70 of the side ramp 47 of the first terminal surface 45 moves past the cross-pin 41, the latter is displaced by the side ramp 47 from the plane of the drawing of FIG. 9 toward the observer until the end 56 of the side ramp 47 moves past the cross-pin 41.

If thereupon the control element 35 rotates in the opposite direction, that is the direction of the arrow 74 of FIG. 9, then the cross-pin 41 shall enter the first channel 43 at the opening 59 associated with the first terminal surface 45 of the control element 35 in order to move therein as far as the opening 60 associated with the second terminal surface 46 of the control element 35 and to move at its second end 51 onto the second terminal surface 46 which then shall move past the cross-pin 41 in the direction of the arrow 74. As soon as the point 82 of the side ramp 48 of the second terminal surface 46 corresponding to the point 70 of the side ramp 47 of the first terminal surface 45 has passed the cross-pin 41, this cross-pin 41 is displaced by the side ramp 48 from the plane of the drawing of FIG. 9 toward the observer until the end 58 of the side ramp 48 passes the cross-pin 41.

The embodiments of FIGS. 10, 11 only differ from that of FIG. 9 in that the two openings 59, 60 of the first channel 43 of the control element 35, respectively comprise the above-described end face 61 and 62 and in that the drive element 10 is supported by a compression spring 83 on the cover 1 of the housing 2 and a compression spring 84 on the housing 2, or cooperates with a stop 85 at the cover 1 and a stop 86 at the housing 2. The compression springs 83, 84 press the cross-pin 41 of the drive element 10 respectively against the first terminal surface 45 of the control element 35 and away from the end face 61 of the associated opening 59 and against the second terminal surface 46 of the control element 35 and away from the end face 62 of the associated opening 60. The stops 85, 86 keep the cross-pin 41 of the drive element 10 respectively at the first terminal surface 45 and away from the end face 61 of the associated opening 59, and at the second terminal surface 46 away from the end face 62 of the associated opening 60. In the embodiment of FIG. 10, the end faces 61, 62 of the openings 59, 60 are offset a corresponding distance from the ends 50, 51 of the first channel 43 toward the ends 56, 58 of the side ramps 47, 48 of the terminal surfaces 45, 46 of the control element 35. As regards the embodiment of FIG. 11, the end faces 76, 77 of the control element 35 each run at a correspondingly larger distance 80' and 81' from the first terminal surface 45 and from the second terminal surface 46 of the control element 35.

The above description is of exemplary embodiments of the invention only and the invention is to be regarded as defined in the following claims.

What is claimed is:

1. A lock adapted to lock a steering shaft or a gear rack of a steering-gear or an output shaft of a transmission of a motor vehicle, said lock comprising a locking element displaceable to-and-fro between a locked and an unlocked position and furthermore a control element rotatable to-and-fro by means of a drive arranged to axially displace a drive element cooperating with the locking element or displacing the locking element directly in either direction, wherein the drive element (10) or the locking element and the control element (35) are arranged and configured to extend coaxially to cooperate in such manner that, by means of
    (a) a cross-pin (41) having two ends (65, 66) which is axially displaceable in a transverse borehole (42) of the drive element (10) or the locking element, and
    (b) two helically running inner channels (43, 44) and a first plane terminal surface (45) of the control element (35) which runs perpendicularly to the axis of rotation (8) of the control element (35) and which adjoins the two helically running inner channels (43, 44) and which is bounded by a first side ramp (47) running from the bottom (54) of one helically running inner channel (43) on the outside of and at a distance (55) from and past the other helically running inner channel (44) toward the drive element (10) or the locking element, during the rotation of the control element (35) in a direction (69) in which the two ends (65, 66) of the cross-pin (41) projecting from the transverse borehole (42) of the drive element (10) or of the locking element move in the two helically running inner channels (43, 44) toward the first plane terminal surface (45) of the control element (35), the drive element (10) or the locking element shall be correspondingly axially displaced and, when the ends (65, 66) of the cross-pin (41) move from the two helically running inner channels (43, 44) onto the first plane terminal surface (45), they shall not move and will remain in the axial position so reached until the control element (35) is rotated in the opposite direction (74) to cause the ends (65, 66) of the cross-pin (41) to run in the two helically running inner channels (43, 44) away from the the first plane terminal surface (45), whereby the drive element (10) or the locking element shall be axially displaced in the opposite direction.

2. The lock as claimed in claim 1, wherein a first opening (59) of a helically running inner channel (43) on the first plane terminal surface (45) of the control element (35) of which the bottom (54) adjoins the first side ramp (47) of the first plane terminal surface (45) comprises a first end face (61) on the side away from the first plane terminal surface (45), said first end face (61) extending in a plane passing through the axis of rotation (8) of the control element (35), and wherein the drive element (10) or the locking element is spring-loaded in a direction to force the cross-pin (41) against the first plane terminal surface (45) and away from said first end face (61), or wherein the drive element (10) or the locking element cooperates with a stop (85) in order to keep the cross-pin (41) at the first plane terminal surface (45) and away from the first end face (61).

3. The lock as claimed in claim 1, wherein the two helically running inner channels (43, 44) having ends (51, 53), merge at the ends (51, 53) located away from the first plane terminal surface (45) into a second plane terminal surface (46) of the control element (35) which extends perpendicularly to the axis of rotation (8) of the control element (35) and is bounded by a second side ramp (48) which runs from the bottom (54) of one helically running inner channel (43) outwardly at a distance (57) and past the other helically running inner channel (44) toward the drive element (10) or the locking element, so that during the rotation of the control element (35) in a direction (74) wherein the two ends (65, 66) of the cross-pin (41) projecting from the transverse borehole (42) of the drive element (10) or of the locking element move in the two helically running inner channels (43, 44) from the first plane terminal surface (45) to the second plane terminal surface (46) of the control element (35), the drive element (10) or the locking element will not move following the corresponding axial displacement of the drive element (10) or the locking element when the two ends (65, 66) of the cross-pin (41) move from the two helically running inner channels (43, 44) onto the second plane terminal surface (46) and shall remain in the axial position reached by the drive element (10) or the locking element until the control element (35) is rotated in the opposite direction (69) and the two ends (65, 66) of the cross-pin (41) move in the two helically running inner channels (43, 44) from the second plane terminal surface (46) to the first plane terminal surface (45), so that the drive element (10) or the locking element moves axially in the opposite direction.

4. The lock as claimed in claim 3, wherein a second opening (60) of that helically running inner channel (43) on the second plane terminal surface (46) of the control element (35) which is adjoined at its bottom (54) by the second side ramp (48) of the second terminal surface (46) comprises at the side away from the second plane terminal surface (46) a second end face (62) which runs in a plane passing through the axis of rotation (8) of the control element (35), and wherein the drive element (10) or the locking element is spring loaded so that the cross-pin (41) is forced against the second plane terminal surface (46) and away from the second end face (62) or wherein the drive element (10) or the locking element cooperates with a stop (63, 86) in order to keep the cross-pin (41) at the second plane terminal surface (46) and away from the second end face (62).

5. The lock as claimed in claim 1, wherein the control element (35) is provided with outer teeth (38) that are engaged by a drive pinion or a drive worm (40).

6. The lock as claimed in claim 1, including a reversible electric motor (34) driving the control element (35) and which enables reversing the direction of rotation of the control element (35).

* * * * *